United States Patent
Hatta et al.

(10) Patent No.: US 6,873,754 B2
(45) Date of Patent: Mar. 29, 2005

(54) OPTICAL SWITCH AND METHOD OF MANUFACTURING THE SAME

(75) Inventors: Tatsuo Hatta, Hyogo (JP); Seiichiro Tabata, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 386 days.

(21) Appl. No.: 10/245,638

(22) Filed: Sep. 18, 2002

(65) Prior Publication Data

US 2003/0174927 A1 Sep. 18, 2003

(30) Foreign Application Priority Data

Mar. 15, 2002 (JP) .......................... 2002-071959

(51) Int. Cl.⁷ .............................. G02B 6/26; G02B 6/42
(52) U.S. Cl. .......................................... 385/16; 385/17
(58) Field of Search .............................. 385/16, 17, 22, 385/11, 4, 88, 14, 21

(56) References Cited

U.S. PATENT DOCUMENTS

| | | | | |
|---|---|---|---|---|
| 4,365,862 A | * | 12/1982 | Terui et al. .................... | 385/16 |
| 4,630,883 A | | 12/1986 | Taylor et al. | |
| 5,432,873 A | * | 7/1995 | Hosoya et al. ................. | 385/21 |
| 6,507,682 B2 | * | 1/2003 | Takeuchi et al. .............. | 385/16 |
| 6,611,635 B1 | * | 8/2003 | Yoshimura et al. ........... | 385/14 |
| 6,647,169 B2 | * | 11/2003 | Takeuchi et al. .............. | 385/16 |
| 6,804,427 B2 | * | 10/2004 | Tabata ........................... | 385/16 |
| 6,810,163 B2 | * | 10/2004 | Saito ............................. | 385/16 |
| 2002/0067878 A1 | | 6/2002 | Hatta et al. | |
| 2002/0168133 A1 | | 11/2002 | Saito | |
| 2003/0147583 A1 | * | 8/2003 | Saito ............................. | 385/17 |
| 2003/0174927 A1 | * | 9/2003 | Hatta et al. .................... | 385/16 |

FOREIGN PATENT DOCUMENTS

| | | |
|---|---|---|
| EP | 0 935 149 | 8/1999 |
| GB | 2 200 764 | 8/1988 |
| JP | 57-163205 | 10/1982 |
| JP | 60-222816 | 11/1985 |
| JP | 2-136805 | 5/1990 |
| JP | 5-289006 | 11/1993 |
| JP | 7-294748 | 11/1995 |
| JP | 11-337850 | 12/1999 |
| WO | WO 01/73481 | 10/2001 |

OTHER PUBLICATIONS

J.E. Fouquet, "Compact optical cross–connect switch based on total reflectionina fluid–containing planar lightwave circuit", Presented at OFC 2000 (Optical Fiber communication Conference, Mar. 7, 2000), TuM1-1—1-4.

Related U.S. Appl. No. 09/836,179, filed Apr. 18, 2001 (Our Ref. No. 57454-176).

* cited by examiner

*Primary Examiner*—Thien M. Le
(74) *Attorney, Agent, or Firm*—McDermott Will & Emery LLP (57) ABSTRACT

An optical switch includes a polymer sheet having an optical waveguide extending linearly therein, keep plates holding the polymer sheet therebetween, and driving means. The polymer sheet has a notch provided to traverse the optical waveguides, and the keep plates each have an opening at a position corresponding to the notch. The opening has an elongated shape along the extending direction of the notch at least on a surface of the keep plate in contact with the polymer sheet. The driving means is for selecting a course of light by switching open and closed states of the notch by pushing and not pushing the polymer sheet via the opening.

13 Claims, 10 Drawing Sheets

POSITION IN THE THICKNESS
OF POLYMER SHEET X

OPTICAL SWITCH AND METHOD OF MANUFACTURING THE SAME

BACKGROUND OF THE INVENTION

1. Field of the Invention

The present invention relates to an optical switch employed for switching optical paths in an optical communication system and a method of manufacturing the same.

2. Description of the Background Art

Figure 21:
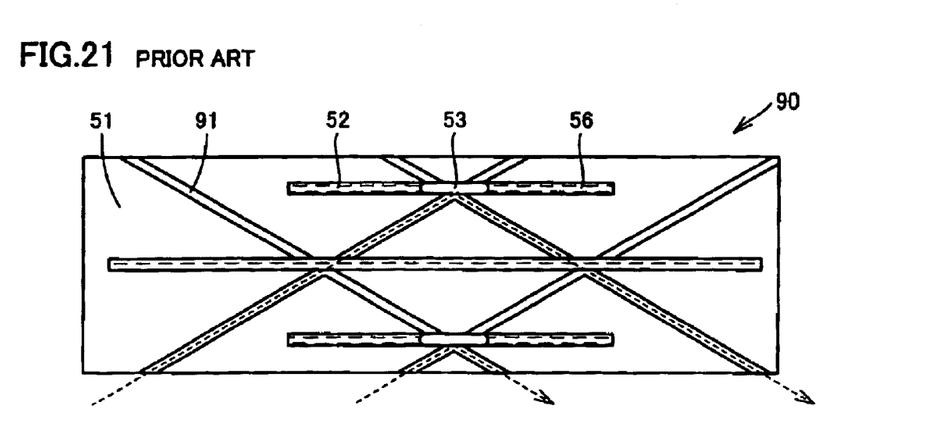
FIG. 21 is a cross sectional view of an optical switch according to Prior Art.

A conventional optical switch 90 will be described with reference to FIG. 21. This optical switch 90 is one shown in TuM1 (J. E. Fouquet, "Compact optical cross-connect switch based on total internal reflection in a fluid-containing planner lightwave circuit") at OFC 2000 (Optical Fiber communication Conference, Mar. 7, 2000). Optical switch 90 is formed by a silica planar optical circuit substrate 51, where a two-dimensional optical circuit is formed by providing a rectangular optical waveguide having a slightly high refractive index within silica planar optical circuit substrate 51. Generally, silica planar optical circuit substrate 51 having a refractive index of about 1.5 is employed, while optical waveguide 91 portion is made of a material with a refractive index that is higher by about 1%. The portion of optical waveguide 91 is in general also referred to as a "core." A trench 52 is formed such that it traverses a position that partially overlaps with a crosspoint of optical waveguide 91, and trench 52 is filled with refractive index-matching oil 56. Refractive index-matching oil 56 is oil having a refractive index equal to that of optical waveguide 91.

An operation of optical switch 90 will be described. In optical switch 90, a bubble generating mechanism, not shown, is provided which can generate a bubble 53 and also make bubble 53 disappear in the liquid of refractive index-matching oil 56 at a crosspoint of optical waveguide 91. For the bubble generating mechanism, as that used for a head of bubble-jet printer may be employed.

When bubble 53 is generated at a crosspoint, a light that enters into the crosspoint is totally reflected by a surface of bubble 53, while when no bubble 53 exists, the light travels in a straight line because optical waveguide 91 and refractive index-matching oil 56 have an equal refractive index. By utilizing this property, an optical path can be switched between two states of reflection/straight travel by generation/disappearance of bubble 53.

In optical switch 90 formed in the above-described manner, accuracy of an etching process requires a width of trench 52 to be at least about 15 $\mu$m. In addition, there is a problem of optical loss of at least 0.07 dB per crosspoint. On the other hand, optical loss L [dB] of optical switch 100 as a whole is given by the following formula:

$$L=2C+(m-1)T+(n-1)T+R,$$

where m is a number of input ports, n is a number of output ports,

C is a loss [in dB] upon entry of a light into an optical switch from an optical fiber and during travel through an optical waveguide to an active area which is a crosspoint, T is a loss [in dB] upon traversing one trench and during transmission through a section of a short optical waveguide between two crosspoints, and R is a loss [in dB] for reflection upon a sidewall of an empty trench and transmission through a section of a short optical waveguide between two crosspoints.

For instance, when configuring a large-scale 1000×1000 optical switch, specific numerical values substituted into the above formula give L=2×0.25+(1000−1)×0.07+(1000−1)×0.07+2.1=142.46 dB. Thus, even with an ideal produced optical switch, optical loss of 142.26 dB would occur. It is necessary to limit optical loss L to 10 dB or below in order for an optical switch to function without degrading signal quality. In this manner, there is a disadvantage in that a larger scale than about 32×32 is difficult to form with such type of configuration when optical loss is considered.

Moreover, silica planar optical circuit substrate 51 is produced by a device similar to that which produces a semiconductor so that a large optical switch would disadvantageously become extremely expensive to produce. Further, since bubble 53 is produced and utilized each time it is needed in refractive index-matching oil 56, there is a problem of optical switching malfunction occurring when the generated bubble 53 is too small or when the bubble is generated out of position. Furthermore, depending on the condition of refractive index-matching oil 56, local absorption of light would take place with a small globule of refractive index-matching oil 56 such that an optical path in its periphery would disadvantageously burn due to the energy of a signal light.

SUMMARY OF THE INVENTION

An object of the present invention is to provide an optical switch that can readily be manufactured, and be formed in large scale with less optical loss.

In order to achieve above mentioned object, the optical switch according to the present invention includes: a polymer sheet having an optical waveguide extending linearly therein; a keep plate in contact with at least one surface of the polymer sheet; and driving means; the polymer sheet having a notch provided to traverse the optical waveguides, the keep plate having an opening at a position corresponding to the notch, the opening having an elongated shape along the extending direction of the notch at least on a surface of the keep plate in contact with the polymer sheet, and the driving means being for selecting a course of light by switching open and closed states of the notch by pushing and not pushing the polymer sheet via the opening. By employing this structure, desired switching can be attained with small pushing force and small displacement.

Preferably in the invention above, the driving means includes a direct pushing member arranged in the opening contactable to the polymer sheet, and the direct pushing member has its position constrained in a planer direction of the keep plate by the shape of the opening. By employing this structure, the notch can be located precisely to be pushed to deform the polymer sheet.

In order to achieve the aforementioned object, the optical switch according to the present invention includes: a polymer sheet having an optical waveguide extending linearly therein; a keep plate in contact with at least one surface of the polymer sheet; and driving means; the polymer sheet having a notch provided to traverse the optical waveguide, the keep plate having an opening at a position corresponding to the notch, the driving means being for selecting a course of light by switching open and closed states of the notch by pushing and not pushing the polymer sheet via the opening, and the optical waveguide and the notch forming an angle of at least 40° and at most the total reflection angle of a light incident from the optical waveguide upon a section formed by the notch. By employing this structure, both of the reduced crosstalk in transmission state and total reflection in reflection state can be attained.

In order to achieve the aforementioned object, a method of manufacturing an optical switch according to the present invention is provided, which optical switch including; a polymer sheet having an optical waveguide extending linearly therein, a keep plate in contact with at least one face of the polymer sheet, and driving means, the polymer sheet having a notch provided to traverse the optical waveguide, the keep plate having an opening at a position corresponding to the notch, the opening having an elongated shape along the extending direction of the notch at least on a surface of the keep plate in contact with the polymer sheet, and the driving means being for selecting a course of light by switching open and closed states of the notch by pushing and not pushing the polymer sheet via the opening, the method including the step of: the notch forming step for forming the notch by a cutter with heat applied to the polymer sheet. By employing this method, bonding between molecules is weakened, whereby sections can be formed smoothly along the sequence of the molecules. Thus, optical loss can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 18:
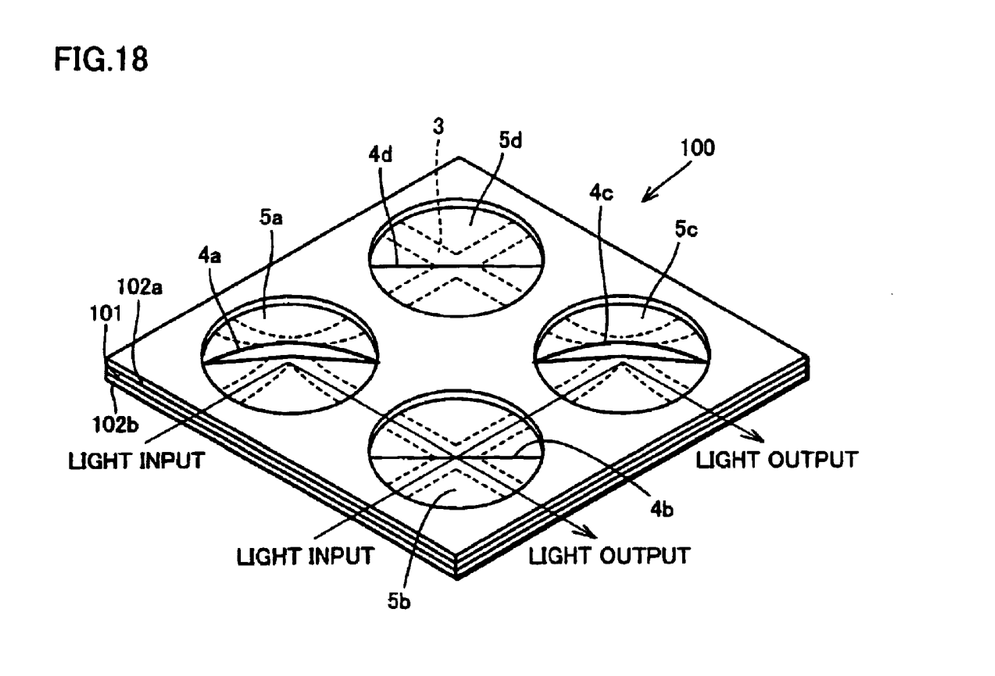
FIG. 18 is an enlarged perspective view of a portion of an optical switch according to related art as a basis of the present invention.

Prior to the specific description of the embodiments of the present invention, an optical switch developed uniquely by the inventors of the present invention will be described. The inventors tried hard to solve the above described problems of the prior art, and succeeded to develop such an optical switch 100 as shown in FIG. 18. The optical switch 100 will be described in the following with reference to FIG. 18.

The optical switch 100 is formed by holding a polymer sheet 101 between keep plates 102a and 102b. In the polymer sheet 101, optical waveguides 3 made of a material having a higher refractive index than the remaining portions of the polymer sheet 101 are arranged in the form of a lattice. Notches 4a to 4d are provided on the surface of the polymer sheet 101 such that they traverse the intersections between the optical waveguides 3. The keep plates 102a and 102b are provided with openings 5a to 5d to expose the notches 4a to 4d, respectively. These openings 5a to 5d define "ports" for switching optical paths.

Figure 19:
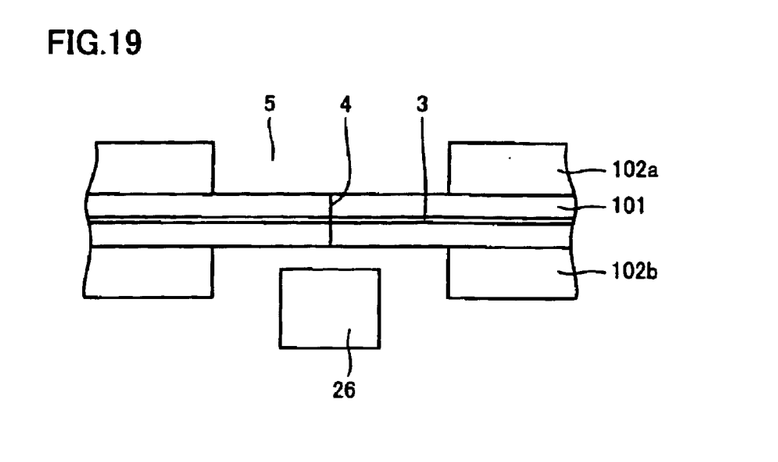
FIG. 19 is a first explanatory illustration of the operation of an optical switch according to related art as a basis of the present invention.
Figure 20:
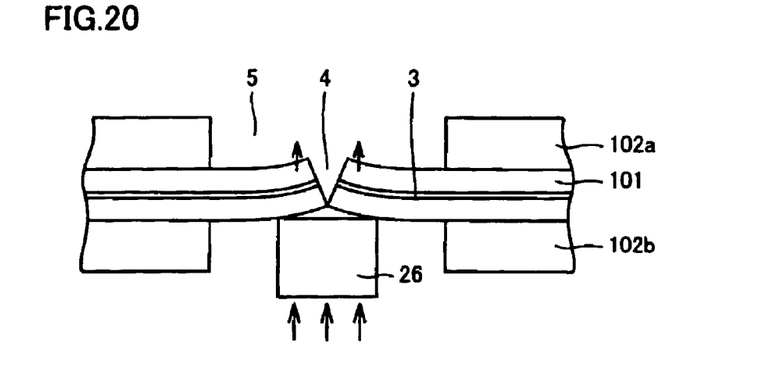
FIG. 20 is a second explanatory illustration of the operation of an optical switch according to related art as a basis of the present invention.

Optical signals enter the optical waveguides 3 of the polymer sheet 101 from the lower left side of FIG. 18, as shown by arrows. FIGS. 19 and 20 are sectional views showing a portion around each port. In each port, the optical path can be selected by pushing up the polymer sheet 101 with a pushing member 26 serving as driving means. When the polymer sheet 101 is not pushed up as shown in FIG. 19, the notch 4 of the polymer sheet 101 is closed and hence the optical waveguides 3 remain continuous to pass the optical signal as such. When the polymer sheet 101 is pushed up with the pushing member 26 as shown in FIG. 20, however, the notch 4 is open to separate the optical waveguides 3 from each other, thereby the optical signal is reflected by the boundary between the optical waveguides 3 and the air. This notch 4 is formed on the intersection between the optical waveguides 3, and hence the reflected optical signal changes its course at this time.

Referring to FIG. 18, the polymer sheet 101 is pushed up only on the ports corresponding to openings 5a and 5c, to open the notches 4a and 4c. Therefore, these ports reflect the optical signals while remaining ports linearly pass the optical signals as such without reflection. Thus, by operating the driving means, one of a plurality of outlets of the optical switch can be selected for outputting an optical signal that has entered from either one of a plurality of inlets.

FIG. 18, showing only four ports, illustrates a part of the optical switch 100 in an enlarged manner. In practice, the optical switch 100 is provided with a larger number of ports and a larger number of optical waveguides 3.

In the optical switch of such a structure, pushing force exerted by the pushing member 26 should only act vertically to the sections of the notch 4, in other words to the direction separating the sections from each other. The tension induced by the pushing, however, may also be exerted in the direction parallel to the sections of the notch 4 since the opening 5 is circular, thereby incurring troubles in controlling the thickness of a layer of the air therebetween.

Particularly, in an optical switch of a large scale, for example, of 32×32, it is extremely difficult to locate intersections to be pushed, among a plurality of intersections of optical waveguides, with a plurality of pushing members.

Additionally, surfaces of the pushing members facing to the waveguides must be processed to be smooth. For this processing, enormous effort or highly developed technique may be required depending on the shape of the pushing member.

Further, undesirable deformation of the polymer sheet incurred by the pushing adversely increases loss of optical signals passing through the optical waveguide.

Further, when an optical signal passes through an optical waveguide even in a state without being pushed and hence being continuous, about ¹⁄₁₀₀₀ of reflection is still generated.

Further, rough section surfaces of a notch adversely increases the loss of optical signal passing through the notch.

The inventors of the present invention achieved improvements for solving the aforementioned problems to reduce optical loss.

In the following, embodiments of the present invention will be described referring to FIGS. 1 to 17. In each embodiment, terms "upper" and "lower" do not refer absolute position, but indicate upper and lower directions in the position illustrated in drawings for convenience.

First Embodiment

Figure 1:
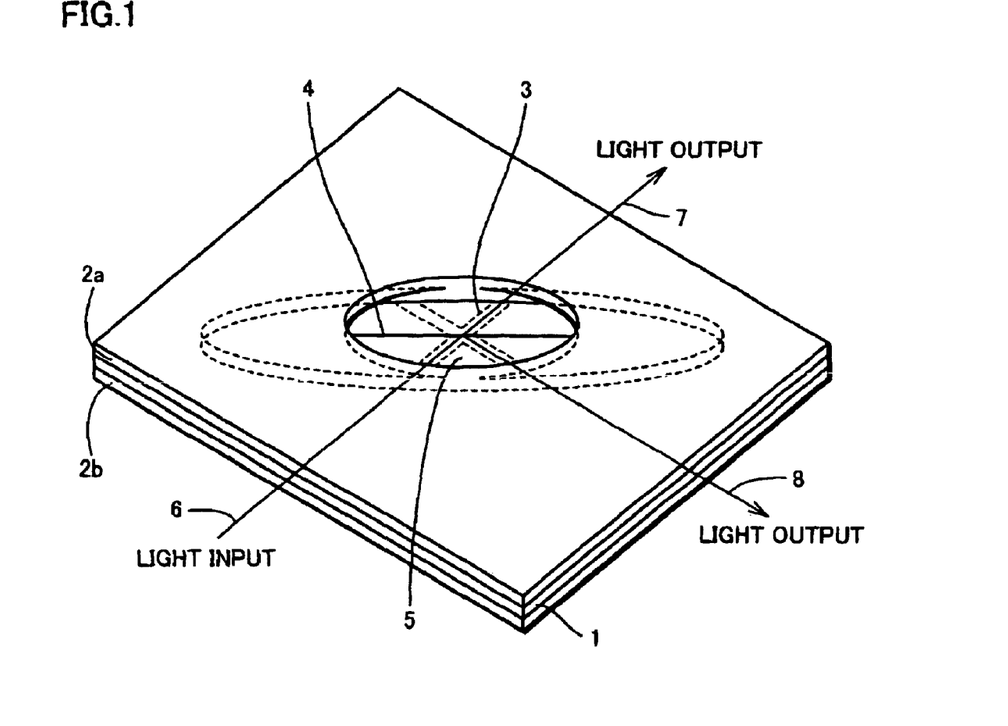
FIG. 1 is an enlarged perspective view of a portion of an optical switch according to a first embodiment of the present invention.
Figure 2:
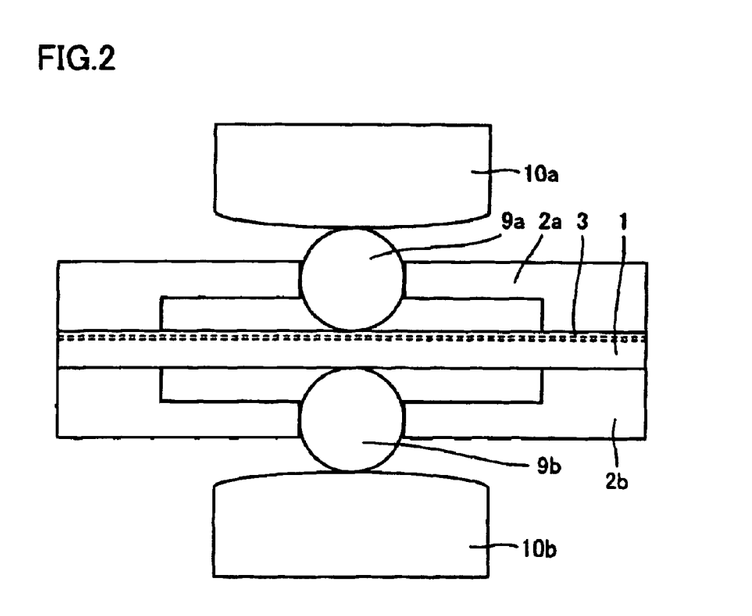
FIG. 2 is an enlarged cross sectional view of a portion of the optical switch, viewed from a first direction, according to the first embodiment of the present invention.
Figure 3:
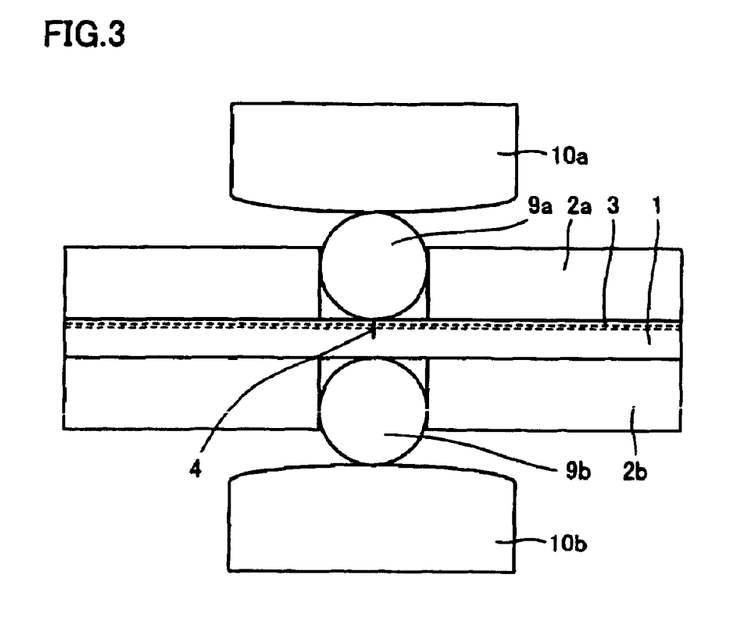
FIG. 3 is an enlarged cross sectional view of a portion of the optical switch, viewed from a second direction, according to the first embodiment of the present invention.

Referring to FIGS. 1 to 3, an optical switch according to a first embodiment of the present invention will be described. It should be noted that FIGS. 1 to 3 are enlarged views illustrating only one of the ports, while an optical switch in practical use includes multiple array of such ports on a plane.

An optical switch of the present embodiment is formed by holding a polymer sheet 1 between keep plates 2a and 2b. Optical waveguides 3 are arranged in the polymer sheet 1 crossing with each other, and a notch 4 is provided from one surface of the polymer sheet 1 such that it traverses the intersection of the optical waveguides 3. An optical signal enters the optical waveguides 3 from the lower left side of FIG. 1 as an incident light 6, then goes out from one side as a transmitting light 7 when transmitting through the notch 4 as such, and goes out from another side as a reflecting light 8 when reflected by the notch 4. An openings 5 of two keep plates 2a and 2b are circular as viewed from the side not facing to the polymer sheet 1, and are elliptical as viewed from the side facing to the polymer sheet 1. As shown in FIG. 1, the elliptical shape has the major axis approximately parallel to the extending direction of the notch 4. In the present embodiment, the diameter of the upper circular portion of the opening 5 is 300 $\mu$m, the major axis of the lower elliptical portion is 900 $\mu$m and the minor axis thereof is 300 $\mu$m. In FIG. 1, elements for driving the optical switch is not shown. FIG. 2 is a cross sectional view thereof along with the elements for driving. FIG. 2 is a cross sectional view taken along the longest diameter of the opening 5. The notch 4 is not shown in FIG. 2 since it extends directly along the section. FIG. 3 is a cross sectional view taken along the minor axis of the opening 5. Balls 9a and 9b are fit into the circular portions of the openings 5 of keep plates 2a and 2b as direct pushing members for pushing the polymer sheet directly when the optical switch is actuated. Balls 9a and 9b have diameters slightly smaller than 300 $\mu$m. As balls 9a and 9b, metal balls utilized for ball bearings can be employed, for example. Further, intervening pushing members 10a and 10b are arranged so as to be able to push the balls 9a and 9b against the polymer sheet 1. In the present specification, "an optical switch" refers not only to a stacked structure configured of a polymer sheet and hold plates, but to the entire structure including such direct pushing members or intervening pushing members.

Next, operation of the present optical switch will be described. When an incoming optical signal as incident light 6 is desired to be output as transmitting light 7, the intervening pushing member 10a is pushed by means of a piezoelectric actuator or the like (not shown) to push the ball 9a against the polymer sheet 1. Then, a thin air layer contained in the notch 4 is ejected by the pushing, and thus optical waveguides 3 adjacent to the notch 4 will come into contact with each other tightly to transmit the optical signal. This state is referred to as physical contact (PC), transmitting approximately 100% of the light because of the tight contact. In this state, the input optical signal is output as the transmitting light 7 shown in FIG. 1.

When an incoming optical signal as incident light 6 is desired to be output as reflecting light 8, the intervening pushing member 10b is pushed by means of a piezoelectric actuator or the like (not shown) to push the ball 9b against the polymer sheet 1. Then, the polymer sheet 1 warps as pushed by the ball 9b, and thus taking in an air layer in the notch 4. As a result, the optical signal from the optical waveguide reflects upon entering the air layer to be output as reflecting light 8 shown in FIG. 1.

The optical switch of the present embodiment allows desired switching with small pushing force and small displacement, since each opening 5 is elliptic on a side facing to the polymer sheet 1, having its major axis approximately parallel to the notch 4.

In the optical switch of the present embodiment, the shape of each opening 5 constrains two-dimensional relationship between the boll 9a and 9b and the plane of the polymer sheet 1. Specifically, the balls 9a and 9b can only travel a certain distance approximately perpendicular to the plane of the polymer sheet 1, whereby the balls 9a and 9b can precisely push the position on the polymer sheet 1 where the notch 4 is arranged.

Though the shape of the direct pushing members is not limited to spherical, it is preferable to employ a spherical member as described above, since a tilt of the pushing member need not be controlled and a constant pushing force is achieved readily with a spherical member. Particularly, balls for ball bearings are preferable to be employed, since a precise spherical shape can be attained in a cost effective manner.

Figure 4:
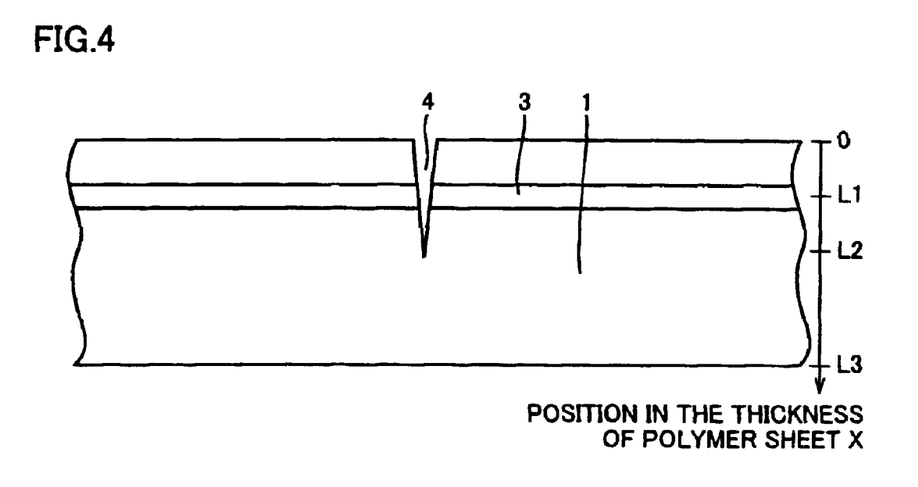
FIG. 4 is a cross sectional view of a polymer sheet of the optical switch according to the first embodiment of the present invention.

FIG. 4 is an enlarged cross sectional view of the polymer sheet 1 as used in the present optical switch taken along the optical waveguide 3. As described above, the optical waveguide 3 is provided lineally in the polymer sheet 1 as a portion having different refractive index from the remainder of the polymer sheet 1. Preferably, the depth to which the optical waveguide 3 is placed is offset to the surface with the notch 4 from the center of thickness of the polymer sheet 1. In such a state, when the polymer sheet 1 is pushed on the surface opposite to the notch 4, the opening degree of the notch 4 relative to the displacement of the pushing member becomes large, and thus an air layer of sufficient thickness can be accommodated with a small displacement of the pushing member. Accordingly, total reflection of light can readily be attained.

Figure 5:
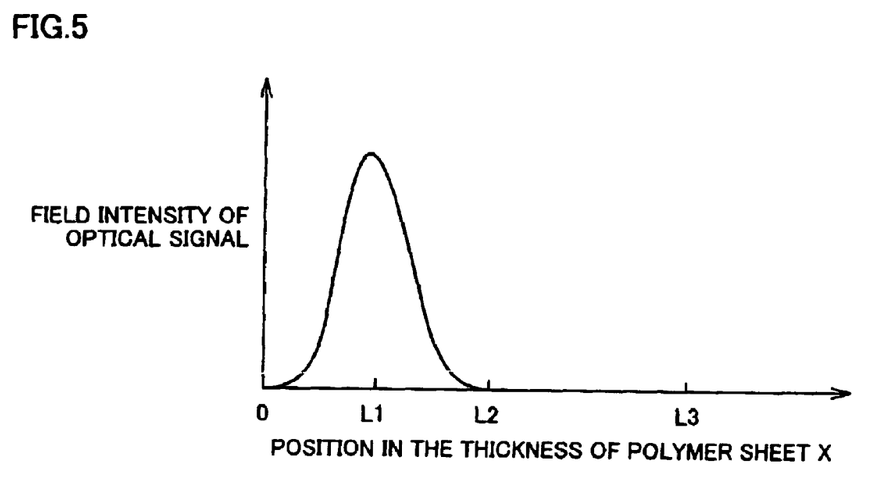
FIG. 5 is a graph showing field intensity distribution of an optical signal propagating through an optical waveguide of the optical switch according to the first embodiment of the present invention.

FIG. 5 shows field intensity of an optical signal propagating through an optical waveguide. If the field intensity is sufficiently small at depth L2, the deepest portion of the notch 4 in the optical waveguide, then the total reflection of light can be attained. To this end, a relationship L2−L1>r must be satisfied, where L1 is a depth at the center of the thickness of the waveguide, and r is a mode field radius of the light propagating through the optical waveguide. Note that "a mode field radius" means a radius in which a light intensity distribution in the direction of radius is $1/e^2$ (where e is the natural logarithm base: 2.71828 . . . ) to the maximum value (usually the value at the center portion of the core of the optical waveguide).

Figure 6:
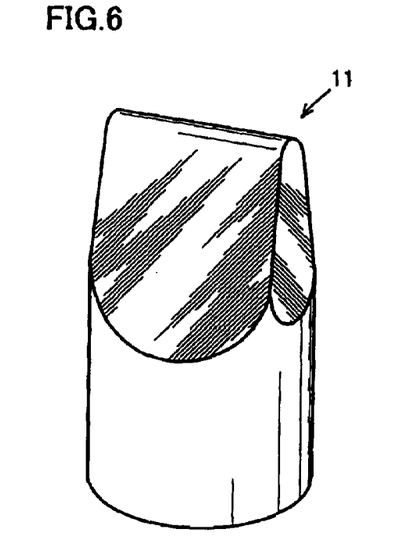
FIG. 6 is a perspective view of a flat pushing member that can be used in the optical switch according to the first embodiment of the present invention.

Though the balls 9a and 9b are employed as direct pushing members in the embodiment described referring to FIGS. 2 and 3, a flat pushing member 11 as shown in FIG. 6 may also be employed. Specifically, at least a tip of the member is flat, which is to be pushed against the notch so as to conform to its shape. Thus, the polymer sheet can effectively be deformed.

Second Embodiment

Figure 7:
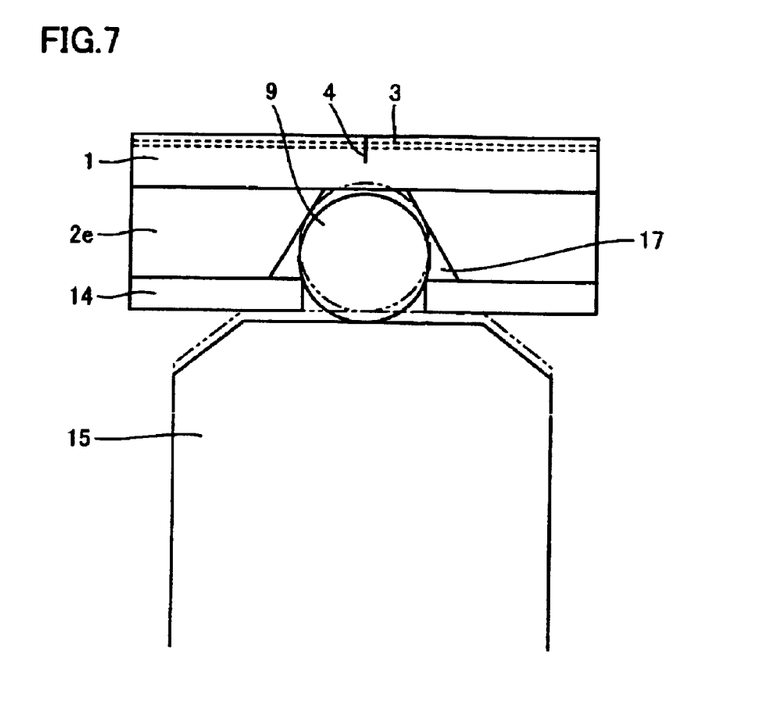
FIG. 7 is an enlarged cross sectional view of a portion of an optical switch according to a second embodiment of the present invention.
Figure 8:
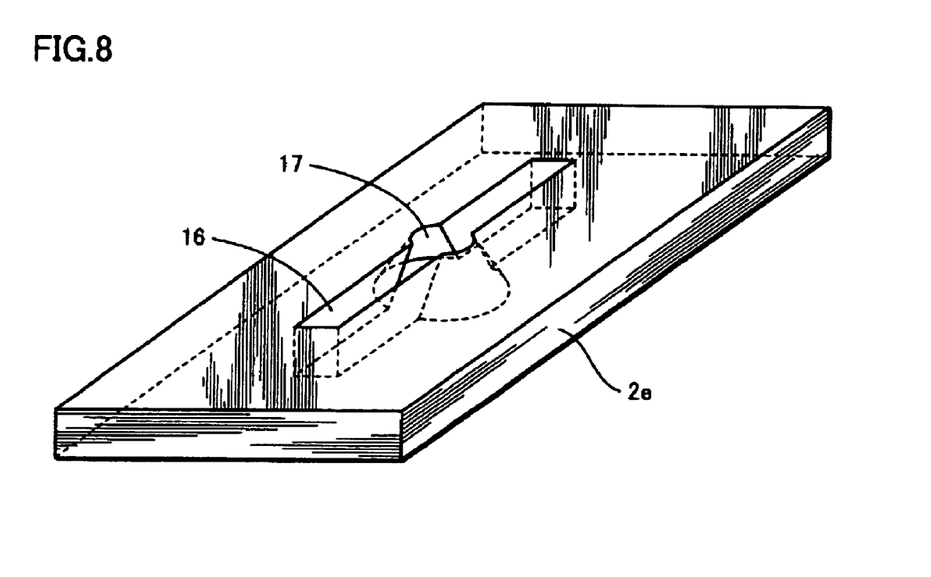
FIG. 8 is a perspective view of a keep plate of the optical switch according to the second embodiment of the present invention.
Figure 9:
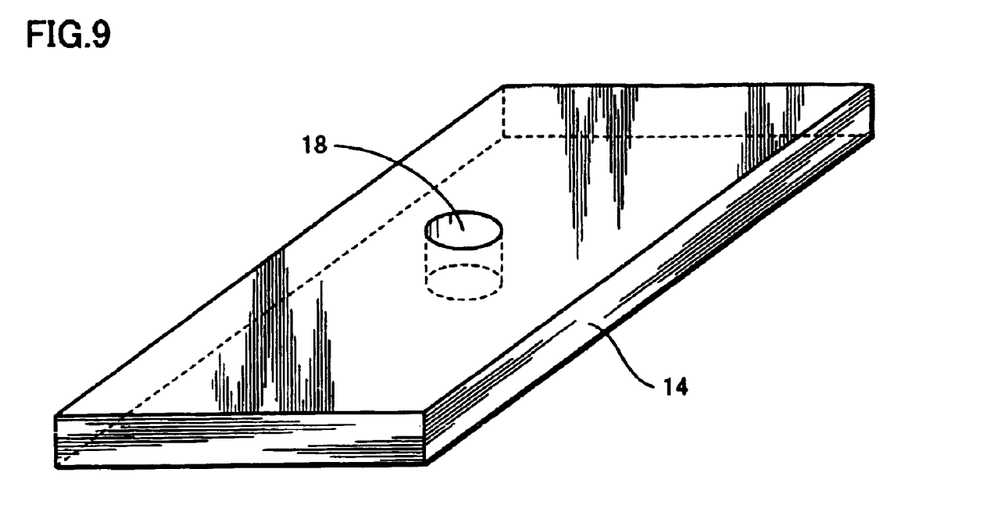
FIG. 9 is a perspective view of a stopper plate of the optical switch according to the second embodiment of the present invention.

Referring to FIGS. 7 to 9, an optical switch according to a second embodiment of the present invention will be described. It should be noted that FIG. 7 is an enlarged view of only one of the ports, while an optical switch in practical use includes multiple array of such ports on a plane. Additionally, one keep plate in contact with the upper surface of a polymer sheet 1 is not shown in FIG. 7.

As a direct pushing member, a ball 9 is employed also in the present optical switch. A keep plate 2e is in contact with bottom of the polymer sheet 1, and a stopper plate 14 is in contact with bottom of the keep plate 2e. As shown in FIG. 8, the keep plate 2e has a tapered hole 17 tapered off upward, and therefrom a slit is extending in two directions forming an angle of approximately 180° with each other. As shown in FIG. 9, a stopper plate 14 is provided with a ball receiving hole 18 having a diameter smaller than that of the ball 9. As shown in FIG. 7, the ball 9 is accommodated in the tapered hole 17 and supported by the stopper plate 14 so as to be kept in place. The keep plate 2e is arranged relative to the polymer sheet 1 such that the slit 16 conforms to the notch 4.

The diameter of the ball receiving hole 18 defines maximum downward travel of the ball 9, thereby the ball 9 at its lowest position partially protrudes out of the bottom surface of the stopper plate 14. The taper angle and inner diameter of the tapered hole 17 define the maximum upward travel of the ball 9, whereby the ball 9 at its highest position partially protrudes out of the upper surface of the keep plate 2e.

A piezoelectric actuator 15 is arranged under the stopper plate 14. By the upward and downward displacement of the upper end of the piezoelectric actuator 15, the ball 9 can be displaced upward and downward. As described for the first embodiment, the upward and downward displacement of the ball 9 of the present embodiment deforms the polymer sheet 1 to separate and contact the optical waveguides.

With the present optical switch, the travel of the ball 9 in the direction perpendicular to the plane of the polymer sheet 1 (the upward and downward direction) is precisely defined by the keep plate 2e and the stopper plate 14, thus the ball 9 is ensured to be pushed up to a prescribed level regardless of variation in the displacement of the piezoelectric actuator 15. Therefore, a stable performance as an optical switch can be attained.

Though only the pushing mechanism arranged under the polymer sheet is shown in FIG. 7, similar pushing mechanism may be provided at the opposite side (above the polymer sheet) correspondingly.

Third Embodiment

Figure 10:
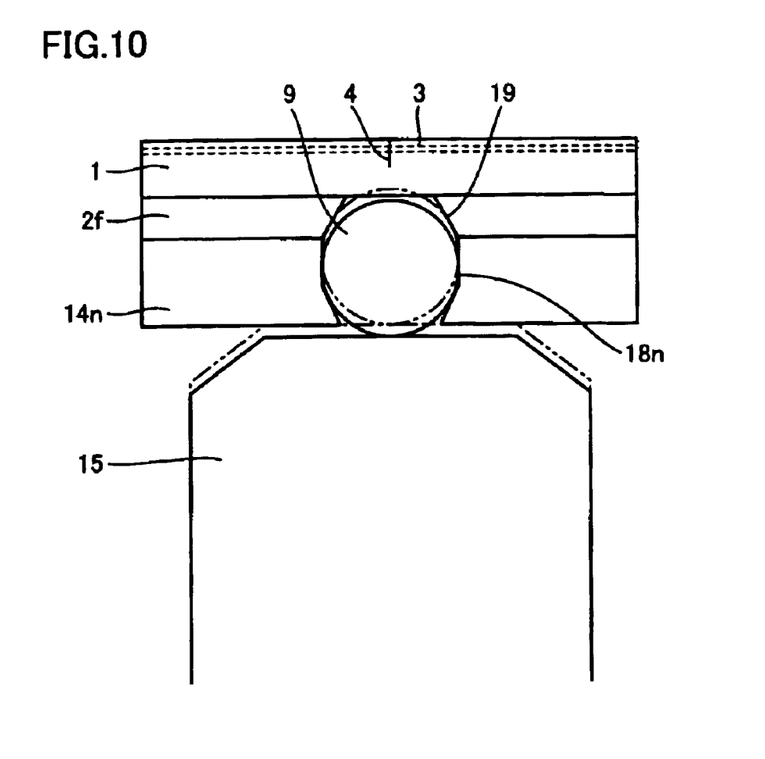
FIG. 10 is an enlarged cross sectional view of a portion of an optical switch according to a third embodiment of the present invention.
Figure 11:
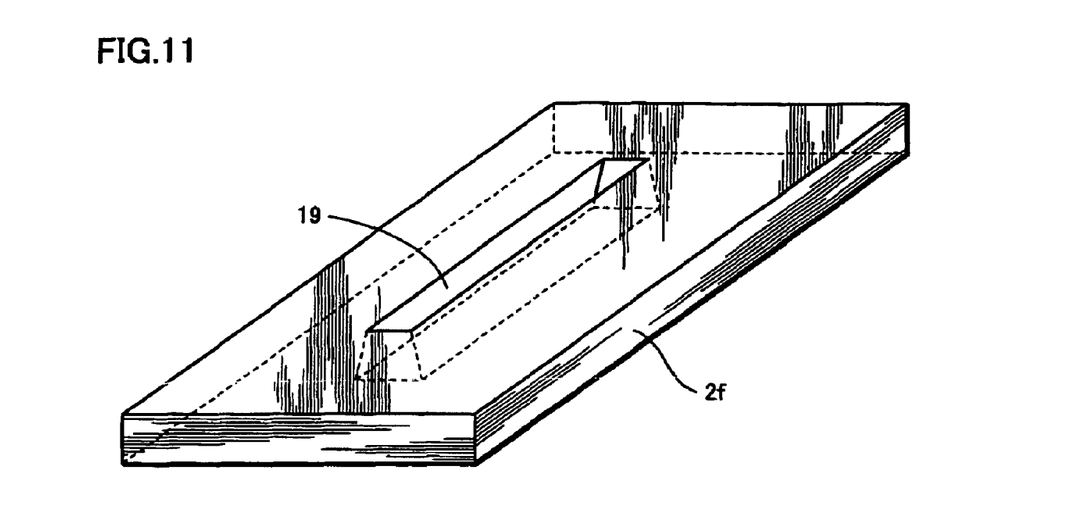
FIG. 11 is a perspective view of a keep plate of the optical switch according to the third embodiment of the present invention.
Figure 12:
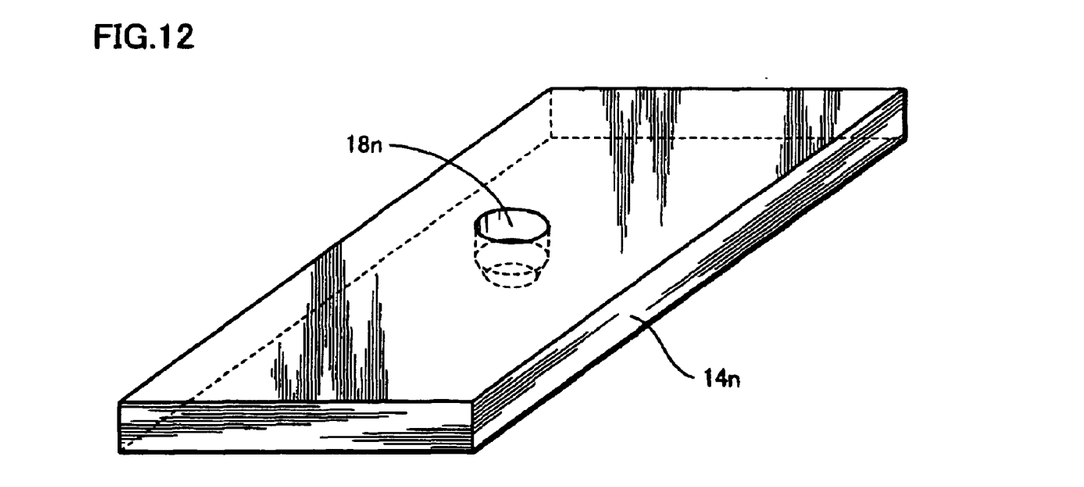
FIG. 12 is a perspective view of a stopper plate of the optical switch according to the third embodiment of the present invention.

Referring to FIGS. 10 to 12, an optical switch according to a third embodiment of the present invention will be described. It should be noted that FIG. 10 is an enlarged view of only one of the ports, while an optical switch in practical use includes multiple array of such ports on a plane. Additionally, one keep plate in contact with the upper surface of a polymer sheet 1 is not shown in FIG. 10.

As a direct pushing member, a ball 9 is also employed in the present optical switch. A keep plate 2f is in contact with bottom of the polymer sheet 1, and a stopper plate 14n is in contact with bottom of the keep plate 2f. As shown in FIG. 11, the keep plate 2f has a tapered slit 19 tapered off upward. As shown in FIG. 12, a stopper plate 14n is provided with a ball receiving hole 18n in which a straight portion having a diameter slightly larger than that of the ball 9 and a tapered portion tapered off downward are connected. As shown in FIG. 10, the ball 9 is accommodated in a space, supported by the tapered slit 19 and the ball receiving hole 18n. The keep plate 2f is arranged relative to the polymer sheet 1 such that the tapered slit 19 conforms to the notch 4.

The tapered portion of the ball receiving hole 18n defines maximum downward travel of the ball 9, whereby the ball 9 at its lowest position partially protrudes out of the bottom surface of the stopper plate 14n. The taper angle of the tapered slit 19 defines the maximum upward travel of the ball 9 being pushed, whereby the ball 9 at its highest position partially protrudes out of the upper surface of the keep plate 2f.

A piezoelectric actuator 15 is arranged below the stopper plate 14n. By the upward and downward displacement of the upper end of the piezoelectric actuator 15, the ball 9 can be displaced upward and downward. As described for the first embodiment, the upward and downward displacements of the ball 9 of the present embodiment deform the polymer sheet 1 to separate and contact the optical waveguides.

With the present optical switch, the travel of the ball 9 in the direction perpendicular to the plane of the polymer sheet 1 (the upward and downward direction) is precisely defined by the keep plate 2f and the stopper plate 14n, thus the ball 9 is ensured to be pushed up to a prescribed level regardless of variation in the displacement of the piezoelectric actuator 15. Therefore, a stable performance as an optical switch can be attained. Additionally, the structure of the hole is simpler than the structure described in the second embodiment, thereby the manufacture of the optical switch can be facilitated.

Though only the pushing mechanism under the polymer sheet is shown in FIG. 10, similar pushing mechanism may be provided at the opposite side (above the polymer sheet) correspondingly.

In the optical switch of the present embodiment, if the stopper plate 14n or the keep plate 2f is warped undesirably as pushed by the piezoelectric actuator 15, then other notch 4 of the surrounding port not being pushed directly will also be open, resulting in malfunction of the switch. In order to prevent deformation of the stopper plate 14n or the keep plate 2f, a reinforce plate 22 having a perforate hole 20 is arranged under the stopper plate 14n. With this arrangement, the piezoelectric actuator 15 below the reinforce plate 22 pushes up the ball 9 via a bar-like intervening pushing member 21. Thus, only required displacement of the upper end of the piezoelectric actuator 15 can be transmitted to ball 9 by means of the intervening pushing member 21 to prevent the stopper plate 14n or the keep plate 2f from being warped as pushed by the piezoelectric actuator 15.

For example, for an optical switch of 32×32, 1024 ports are required for switching courses of light. Some gf of force applied to each port results in some kgf of force being applied to the entire keep plate. On selecting the aforementioned reinforce plate 22, a plate strong enough to withstand the accumulated force is required. For example, a stainless plate having a thickness of 2 mm is employed as the reinforce plate 22.

Figure 13:
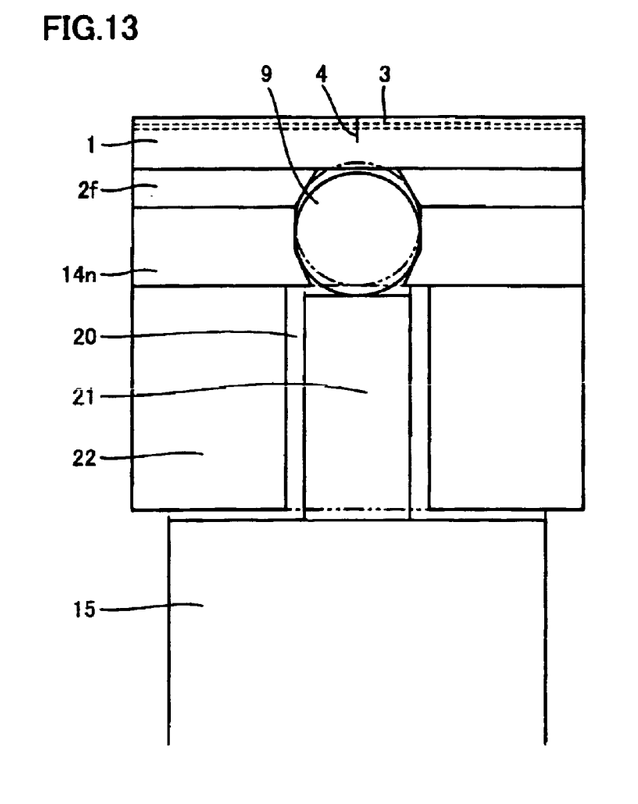
FIG. 13 is an enlarged cross sectional view of a portion of a modification of the optical switch according to the third embodiment of the present invention.

The ball 9 may directly be pushed upward by the piezoelectric actuator 15 without using the bar-like intervening pushing member 21 as shown in FIG. 13, even when the reinforce plate 22 is employed. In this case, however, the diameter of the perforate hole 20 must be larger than that of the piezoelectric actuator 15 to bring the piezoelectric actuator 15 into contact with the ball 9, which in turn diminishes the effect of the reinforce plate 22. Therefore, when using the reinforce plate 22, the bar-like or pin-like intervening pushing member 21 is preferably employed.

It should be noted that the structure employing the reinforce plate and the intervening pushing member may be applied to the structure shown in the first or second embodiment.

Fourth Embodiment

Figure 14:
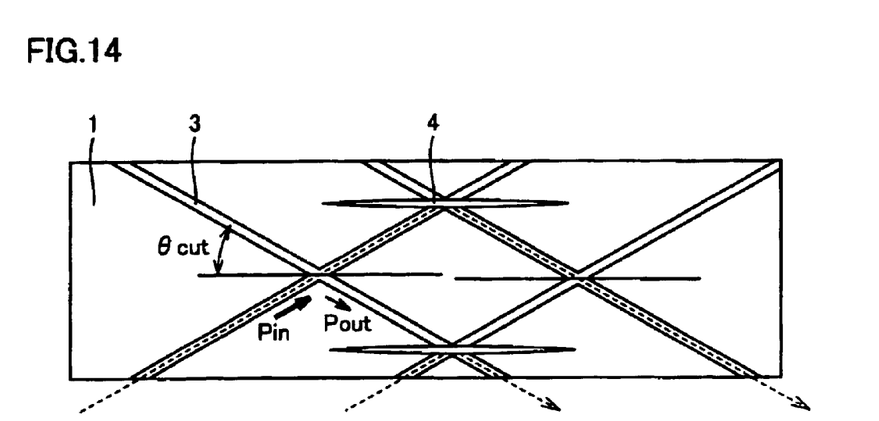
FIG. 14 is an explanatory illustration of the operation of an optical switch according to a fourth embodiment of the present invention.
Figure 15:
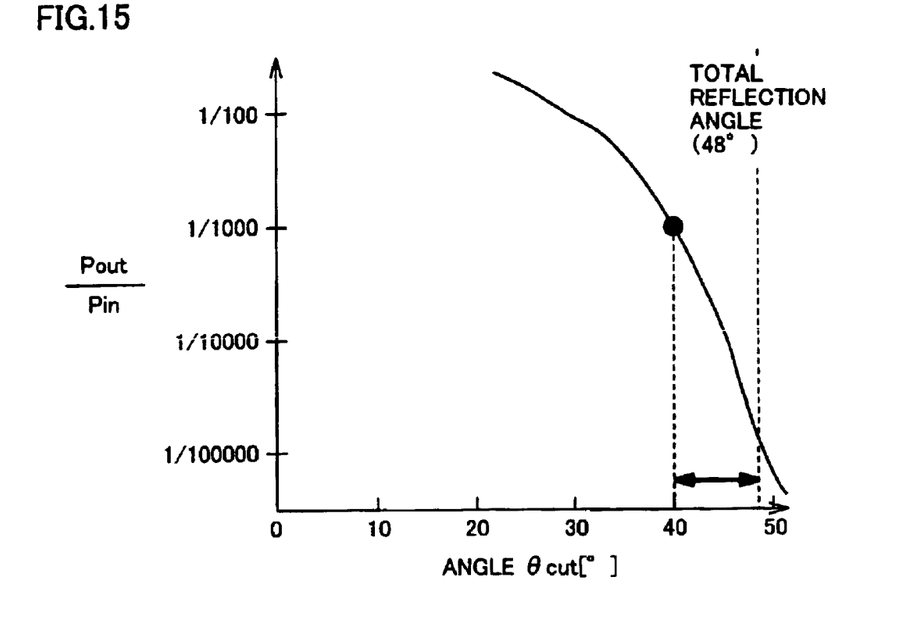
FIG. 15 is a graph showing relationship between angle θcut and reflection Pout/Pin.

In FIG. 1 referred in the description of the first embodiment, one example of an optical switch is shown, in which at the intersection of two optical waveguides 3 perpendicular to each other, the notch 4 is provided to form an angle of 45° with each optical waveguide 3. The angle is not necessarily be 45°, and may be at least of 40° and at most the total reflection angle as shown in FIG. 14. The total reflection angle is determined by the refractive index of the optical waveguides 3 and that of the air, which is 48° in the present example. At the intersection, if an angle θcut, formed by an optical waveguide 3 and a notch 4, is smaller than the total reflection angle of 48°, then an switching operation can be attained by opening/closing of the notch 4. On the other hand, if the angle θcut is extremely small, then considerable reflection will be resulted and the crosstalk within the optical switch will increase, even in a state where the notch 4 is closed to contact the optical waveguides 3 with each other, in other words in a light transmitting state. FIG. 15 shows the relationship between the angle θcut and the reflection Pout/Pin when the notch 4 is closed to contact the optical waveguides 3 with each other.

As shown in FIG. 15, if θcut<40°, then reflecting light of more than 1/1000 will be generated and crosstalk will increase, even in the light transmitting state, and thus optimum switching performance can no longer be attained. Therefore, both of reduced crosstalk in the light transmitting state and total reflection in the light reflecting state can only be attained when the angle θcut is set at least 40° and at most the total reflection angle.

Fifth Embodiment

A method of manufacturing an optical switch will be described in a fifth embodiment according to the present invention. Particularly, of all the steps included in the manufacturing method, the step of forming a notch 4 in a polymer sheet 1 will be described.

Figure 16:
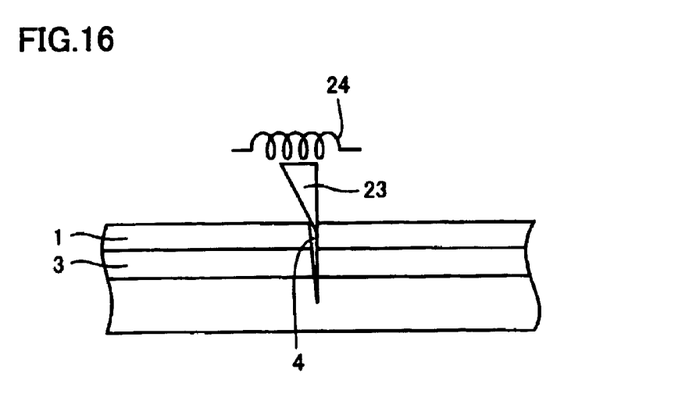
FIG. 16 is an explanatory illustration of a step included in a method of manufacturing an optical switch according to a fifth embodiment of the present invention.

As shown in FIG. 16, a cutter 23 is heated by a heater 24 to approximately 300° C., which is the upper limit of thermally resistant temperature of a polyimide material constituting the polymer sheet 1. In such a state, the cutter 23 is smoothly slid along the polymer sheet 1 to cut the same. Portions to be cut in the polymer sheet 1 are firstly heated by the cutter 23 to weaken the binding of molecules, and thus subsequent contact of the cutter 23 to the polymer sheet 1 facilitates disconnection of the weakened binding of molecules. Accordingly, sections of the polymer sheet are formed smoothly along the sequence of the molecule.

The section of the notch 4 smoothly formed as described above can achieve decreased optical loss.

Sixth Embodiment

Another method of manufacturing an optical switch will be described in a sixth embodiment. Particularly, of all the steps included in the manufacturing method, the step of forming a notch 4 in a polymer sheet will be described.

Figure 17:
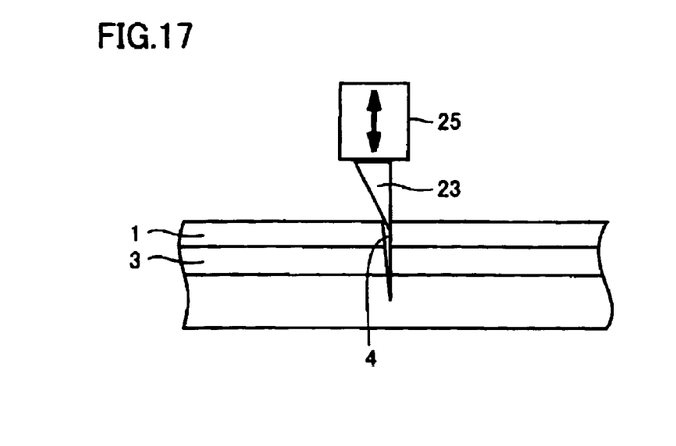
FIG. 17 is an explanatory illustration of a step included in a method of manufacturing an optical switch according to a sixth embodiment of the present invention.

As shown in FIG. 17, a cutter 23 vibrated with a ultrasound vibrator 23 is employed. In such a state, the cutter 23 is smoothly slid along the polymer sheet 1 to cut the same. At portions to be cut in the polymer sheet 1, frictional heat will be generated by the abrasion of the vibrating cutter 23 and the polymer sheet 1. Portions to be cut in the polymer sheet 1 are firstly heated by the frictional heat to weaken the binding of molecules, and thus subsequent contact of the cutter 23 to the polymer sheet 1 facilitates disconnection of the weakened binding of molecules. Accordingly, sections of the polymer sheet is formed smoothly along the sequence of the molecule.

The section of the notch 4 smoothly formed as described above can achieve decreased optical loss. Further, usage of frictional heat as compared to that of heater allows concentrated heat application to the portion of the polymer sheet 1 where cutting is desired. As such, entire deformation of the polymer sheet 1 by the heat is prevented in achieving the object. By employing the ultrasound vibrator as means for applying vibration, frictional heat can be generated while the position of the section is precisely controlled.

According to the present invention, the notch can be opened and closed more precisely with small pushing force and small displacement. Therefore, the optical loss is decreased and desired switching operation is ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical switch, comprising:
   a polymer sheet having an optical waveguide extending linearly therein;
   a keep plate in contact with at least one surface of said polymer sheet; and
   driving means; wherein
   said polymer sheet has a notch provided to traverse said optical waveguides,
   said keep plate has an opening at a position corresponding to said notch, said opening has an elongated shape along the extending direction of said notch at least on a surface of said keep plate in contact with said polymer sheet, and said driving means is for selecting a course of light by switching open and closed states of said notch by pushing and not pushing said polymer sheet via said opening.

2. The optical switch according to claim 1, wherein said driving means includes a direct pushing member arranged in said opening contactable to said polymer sheet, and said direct pushing member has its position constrained in a planer direction of said keep plate by the shape of said opening.

3. The optical switch according to claim 2, wherein said opening is irregular in shape in the direction of thickness of said keep plate, and has a shape, in a part except for said surface in contact with said polymer sheet, for constraining said direct pushing member to be kept in a position within said elongated opening corresponding to said notch.

4. The optical switch according to claim 3, wherein said opening is irregular in shape in the direction of thickness of said keep plate, and includes a tapered portion tapered off toward said surface in contact with said polymer sheet.

5. The optical switch according to claim 2, further comprising:

a reinforce plate having a perforate hole at a position corresponding to said direct pushing member at the surface opposite to said surface in contact with said polymer sheet;

an intervening pushing member arranged for passing through said perforate hole; and a driving source for pushing said direct pushing member via said intervening pushing member.

6. The optical switch according to claim 1, wherein said optical waveguide is arranged at a depth offset from the center of thickness of said polymer sheet.

7. The optical switch according to claim 6, wherein a distance between a deepest part of said notch and said optical waveguide is longer than a mode field radius of said optical waveguide.

8. The optical switch according to claim 1, wherein said direct pushing member is a spherical member.

9. The optical switch according to claim 1, wherein said direct pushing member has, on one end contacting to said polymer sheet, a tip having an elongated shape parallel to the extending direction of said notch.

10. An optical switch, comprising:

a polymer sheet having an optical waveguide extending linearly therein;

a keep plate in contact with at least one surface of said polymer sheet; and driving means; wherein said polymer sheet has a notch provided to traverse said optical waveguide, said keep plate has an opening at a position corresponding to said notch, said driving means is for selecting a course of light by switching open and closed states of said notch by pushing and not pushing said polymer sheet via said opening, and said optical waveguide and said notch form an angle of at least 40° and at most total reflection angle of a light entering from said optical waveguide to a section formed by said notch.

11. A method of manufacturing an optical switch, said optical switch including;

a polymer sheet having an optical waveguide extending linearly therein, a keep plate in contact with at least one face of said polymer sheet, and driving means, wherein said polymer sheet has a notch provided to traverse said optical waveguide, said keep plate has an opening at a position corresponding to said notch, and said driving means is for selecting a course of light by switching open and closed states of said notch by pushing and not pushing said polymer sheet via said opening, said method comprising:

the notch forming step for forming said notch by a cutter with heat applied to said polymer sheet.

12. The method of manufacturing an optical switch according to claim 11, wherein said notch forming step includes cutting said polymer sheet with said cutter having a temperature approximately at the upper limit of thermally resistant temperature of said polymer sheet.

13. The method of manufacturing an optical switch according to claim 12, wherein said application of heat in said notch forming step is performed with frictional heat generated between said cutter and said polymer sheet by vibrating said cutter while in contact with said polymer sheet.

* * * * *